United States Patent
Zhang et al.

(10) Patent No.: US 9,900,601 B2
(45) Date of Patent: *Feb. 20, 2018

(54) INTRA-FRAME PREDICTION AND DECODING METHODS AND APPARATUSES FOR IMAGE SIGNAL

(71) Applicant: Huawei Technologies Co., Ltd., Shenzhen (CN)

(72) Inventors: Xingyu Zhang, Hong Kong (HK); Oscar Au, Hong Kong (HK); Haitao Yang, Shenzhen (CN); Jiantong Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/254,669

(22) Filed: Sep. 1, 2016

(65) Prior Publication Data

US 2016/0373765 A1 Dec. 22, 2016

Related U.S. Application Data

(63) Continuation of application No. 14/265,788, filed on Apr. 30, 2014, now Pat. No. 9,462,273, which is a (Continued)

(30) Foreign Application Priority Data

Nov. 4, 2011 (CN) .......................... 2011 1 0347750

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/14* (2014.11);
(Continued)

(58) Field of Classification Search
CPC combination set(s) only.
See application file for complete search history.

(56) References Cited

U.S. PATENT DOCUMENTS

2011/0249741 A1    10/2011   Zhao et al.
2011/0255591 A1*   10/2011   Kim ..................... H04N 19/107
                                                  375/240.02
(Continued)

FOREIGN PATENT DOCUMENTS

CN    1756364 A      4/2006
CN    1784015 A      6/2006
CN    101494792 A    7/2009

OTHER PUBLICATIONS

Lucas, L., et al., "Intra-prediction for Color Image Coding using Yuv Correlation," Proceedings of 2010 IEEE 17th International Conference on Image Processing, Sep. 26-29, 2010, 4 pages.

(Continued)

*Primary Examiner* — Sath V Perungavoor
*Assistant Examiner* — Janese Duley
(74) *Attorney, Agent, or Firm* — Conley Rose, P.C.

(57) ABSTRACT

An intra-frame decoding method includes obtaining, from a video code stream, prediction mode information of a first signal component of a current block; determining a prediction mode of the first signal component of the current block from a prediction mode set of the first signal component of the current block according to the prediction mode information of the first signal component of the current block, where the prediction mode set of the first signal component of the current block includes at least one of a linear model (Continued)

above (LMA) mode and a linear model left (LML) mode; obtaining a predicted value of a first signal component sampling point of the current block; and obtaining a reconstructed value of the first signal component sampling point of the current block according to the predicted value of the first signal component sampling point of the current block.

17 Claims, 10 Drawing Sheets

Related U.S. Application Data continuation of application No. PCT/CN2012/084079, filed on Nov. 5, 2012.

(51) Int. Cl.
*H04N 19/176* (2014.01)
*H04N 19/593* (2014.01)
*H04N 19/186* (2014.01)
*H04N 19/59* (2014.01)
*H04N 19/14* (2014.01)

(52) U.S. Cl.
CPC ......... *H04N 19/176* (2014.11); *H04N 19/186* (2014.11); *H04N 19/59* (2014.11); *H04N 19/593* (2014.11)

(56) References Cited

U.S. PATENT DOCUMENTS

2012/0287995 A1* 11/2012 Budagavi ............... H04N 19/11
375/240.12
2013/0003856 A1* 1/2013 Saxena ................ H04N 19/159
375/240.18

OTHER PUBLICATIONS

Chen, J., et al., "CE6.a.4: Chroma intra prediction by reconstructed luma samples," JCTVC-E266, Mar. 16-23, 2011, 10 pages.
"Series H: Audiovisual and Multimedia Systems, Infrastructure of audiovisual services—Coding of moving video, Advanced video coding for generic audiovisual services," ITU-T, H.264, Jun. 2011, 686 pages.
Office Action dated May 4, 2016, 22 pages, U.S. Appl. No. 14/265,788, filed Apr. 30, 2014.
Foreign Communication From a Counterpart Application, PCT Application No. PCT/CN2012/084079, English Translation of International Search Report dated Feb. 7, 2013, 2 pages.
Foreign Communication From a Counterpart Application, PCT Application No. PCT/CN2012/084079, English Translation of Written Opinion dated Feb. 7, 2013, 16 pages.

\* cited by examiner

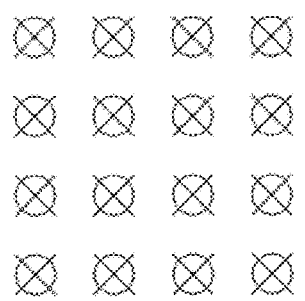 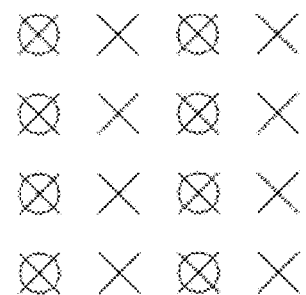 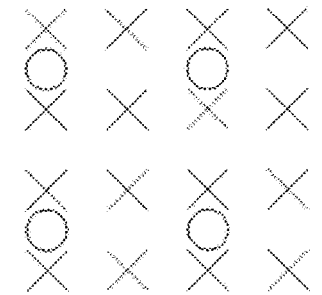
FIG. 1A - 4:4:4 format　　FIG. 1B - 4:2:2 format　　FIG. 1C - 4:2:0 format
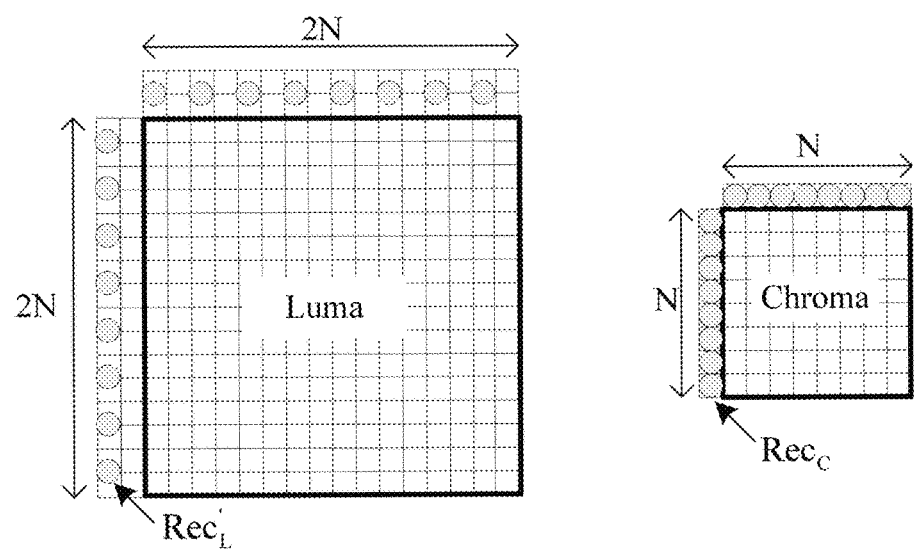
FIG. 2

INTRA-FRAME PREDICTION AND DECODING METHODS AND APPARATUSES FOR IMAGE SIGNAL

CROSS-REFERENCE TO RELATED APPLICATIONS

This application is a continuation of U.S. patent application Ser. No. 14/265,788, filed on Apr. 30, 2014, which is a continuation of International Application No. PCT/CN2012/084079, filed on Nov. 5, 2012, which claims priority to Chinese Patent Application No. 201110347750.2, filed on Nov. 4, 2011. The aforementioned patent applications are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to the field of communications technologies, and in particular, to an intra-frame decoding method and apparatus for a signal component sampling point of an image block and a prediction method and apparatus for a signal component sampling point of an image block.

BACKGROUND

Existing video image coding technologies include an intra-frame coding technology and an inter-frame coding technology. Intra-frame coding is a technology of coding image content using only spatial correlation in a currently coded image block. Inter-frame coding is a technology of coding a currently coded image block using time correlation between the currently coded image block and a coded image block.

To increase intra-frame coding efficiency for an image, an intra-frame prediction technology is first introduced in the H.264 Advanced Video Coding (H.264/AVC) standard to remove spatial information redundancy between a currently coded image block (hereinafter referred to as a current block) and an adjacent coded image block. The High Efficiency Video Coding (HEVC) solution is a new-generation video coding standardization solution currently being studied by the International Organization for Standardization, which inherits and is extended from the intra-frame prediction coding technology in the H.264/AVC standard. A prediction mode set of a chrominance component of an image block may include six optional prediction modes: a direct mode (DM) mode: prediction is performed using a prediction mode of a luminance component of a current block as a prediction mode of a chrominance component of the current block; a linear method (LM) mode: a predicted value of a chrominance component sampling point is calculated based on a correlation model using a reconstructed value of a luminance component sampling point, where a parameter of the correlation model is obtained through calculation according to reconstructed values of luminance component and chrominance component sampling points right above and on the left of a current block; a direct current (DC) mode: an average value of reconstructed values of adjacent chrominance component sampling points right above and on the left of a current block is used as a predicted value of a chrominance component sampling point of the current block; a planar mode: a predicted value of a chrominance component sampling point of a current block is calculated based on an assumption of spatial smooth linear variation of values of chrominance component sampling points; a horizontal mode: a reconstructed value of a chrominance component sampling point on the left side of a current block is used as a predicted value of all chrominance component sampling points in a same row of the current block; and a vertical mode: a reconstructed value of an adjacent chrominance component sampling point right above a current block is used as a predicted value of all chrominance component sampling points in a same column of the current block.

Among the foregoing prediction modes, the DC mode, the vertical mode, the horizontal mode, and the planar mode have a same basic principle as corresponding prediction modes in the H.264/AVC standard, but specific implementation methods are different. The LM mode and the DM mode are two newly added prediction modes.

However, in the existing HEVC solution, a prediction mode set of a chrominance component cannot adapt to the diversity of edge positions of a current block, and in some cases, a prediction effect needs to be improved.

SUMMARY

Embodiments of the present disclosure provide an intra-frame decoding method and apparatus for a signal component sampling point of an image block and a prediction method and apparatus for a signal component sampling point of an image block, so as to improve the accuracy of intra-frame prediction of a current block.

An embodiment of the present disclosure provides a prediction method for a signal component sampling point of an image block, which includes calculating, based on a correlation model, a predicted value of a first signal component sampling point of a current block according to a reconstructed value of a second signal component sampling point of the current block and a parameter of the correlation model, where the parameter of the correlation model is obtained through calculation according to a reconstructed value of a first adjacent signal component sampling point above the current block and a reconstructed value of a second adjacent signal component sampling point above the current block.

An embodiment of the present disclosure further provides a prediction method for a signal component sampling point of an image block, which includes calculating, based on a correlation model, a predicted value of a first signal component sampling point of a current block according to a reconstructed value of a second signal component sampling point of the current block and a parameter of the correlation model, where the parameter of the correlation model is obtained through calculation according to a reconstructed value of a first adjacent signal component sampling point on the left side of the current block and a reconstructed value of a second adjacent signal component sampling point on the left side of the current block.

An embodiment of the present disclosure further provides an intra-frame decoding method for a signal component sampling point of an image block, which includes obtaining, from a video code stream, prediction mode information of a first signal component of a current block; determining a prediction mode of the first signal component of the current block from a prediction mode set of the first signal component of the current block according to the prediction mode information of the first signal component of the current block, where the prediction mode set of the first signal component of the current block includes at least one of a linear model above (LMA) mode and a linear model left (LML) mode; obtaining a predicted value of a first signal component sampling point of the current block according to the prediction mode of the first signal component of the current block; and obtaining a reconstructed value of the first signal component sampling point of the current block according to the predicted value of the first signal component sampling point of the current block.

An embodiment of the present disclosure further provides an intra-frame decoding method for a signal component sampling point of an image block, which includes obtaining, from a video code stream, prediction mode information of a first signal component of a current block; determining a prediction mode of the first signal component of the current block from a prediction mode set of the first signal component of the current block according to the prediction mode information of the first signal component of the current block, where the prediction mode set of the first signal component includes a prediction mode based on a correlation model, and the prediction mode based on the correlation model is determined depending on a prediction mode of a second signal component of the current block; obtaining a predicted value of a first signal component sampling point of the current block according to the prediction mode of the first signal component of the current block; and obtaining a reconstructed value of the first signal component sampling point of the current block according to the predicted value of the first signal component sampling point of the current block.

An embodiment of the present disclosure further provides a prediction apparatus for a signal component sampling point of an image block, which includes a first parameter unit configured to obtain a parameter of a correlation model through calculation according to a reconstructed value of a first adjacent signal component sampling point above a current block and a reconstructed value of a second adjacent signal component sampling point above the current block; and a first predicting unit configured to calculate, based on the correlation model, a predicted value of a first signal component sampling point of the current block according to a reconstructed value of a second signal component sampling point of the current block and the parameter of the correlation model.

An embodiment of the present disclosure further provides a prediction apparatus for a signal component sampling point of an image block, which includes a second parameter unit configured to obtain a parameter of a correlation model through calculation according to a reconstructed value of a first adjacent signal component sampling point on the left side of a current block and a reconstructed value of a second adjacent signal component sampling point on the left side of the current block; and a second predicting unit configured to calculate, based on the correlation model, a predicted value of a first signal component sampling point of the current block according to a reconstructed value of a second signal component sampling point of the current block and the parameter of the correlation model.

An embodiment of the present disclosure further provides an intra-frame decoding apparatus for a signal component sampling point of an image block, which includes a first obtaining unit configured to obtain, from a video code stream, prediction mode information of a first signal component of a current block; a first determining unit configured to determine a prediction mode of the first signal component of the current block from a prediction mode set of the first signal component of the current block according to the prediction mode information of the first signal component of the current block, where the prediction mode set of the first signal component of the current block includes at least one of an LMA mode and an LML mode; a third predicting unit configured to obtain a predicted value of a first signal component sampling point of the current block according to the prediction mode of the first signal component of the current block; and a first calculating unit configured to obtain a reconstructed value of the first signal component sampling point of the current block according to the predicted value of the first signal component sampling point of the current block.

An embodiment of the present disclosure further provides an intra-frame decoding apparatus for a signal component sampling point of an image block, which includes a second obtaining unit configured to obtain, from a video code stream, prediction mode information of a first signal component of a current block; a second determining unit configured to determine a prediction mode of the first signal component of the current block from a prediction mode set of the first signal component of the current block according to the prediction mode information of the first signal component of the current block, where the prediction mode set of the first signal component includes a prediction mode based on a correlation model, and the prediction mode based on the correlation model is determined depending on a prediction mode of a second signal component of the current block; a fourth predicting unit configured to obtain a predicted value of a first signal component sampling point of the current block according to the prediction mode of the first signal component of the current block; and a second calculating unit configured to obtain a reconstructed value of the first signal component sampling point of the current block according to the predicted value of the first signal component sampling point of the current block.

According to the technical solutions provided in the embodiments of the present disclosure, by using a technical means of introducing an LMA mode and an LML mode in a process of intra-frame prediction of a current block, the accuracy of intra-frame prediction of the current block is improved.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

FIGS. 1A, 1B, and 1C are schematic diagrams of a luminance-chrominance (YUV) format;

FIG. 2 is a schematic diagram of an L-type template used for an LM mode;

DETAILED DESCRIPTION

Figure 3A:
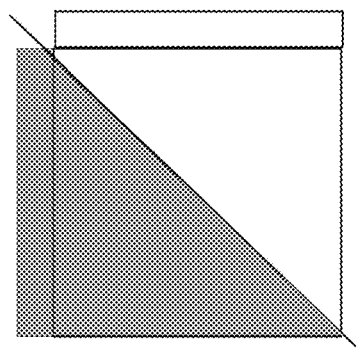
FIGS. 3A and 3B are schematic diagrams showing distribution of sampling points in an L-type template and objects in a current block.

The following clearly describes the technical solutions in the embodiments of the present disclosure with reference to the accompanying drawings in the embodiments of the present disclosure. The embodiments to be described are merely a part rather than all of the embodiments of the present disclosure. All other embodiments obtained by persons of ordinary skill in the art based on the embodiments of the present disclosure without creative efforts shall fall within the protection scope of the present disclosure.

A video image signal generally includes one luminance component and two chrominance components. The luminance component is generally indicated by a symbol Y, and the chrominance components are generally indicated by symbols U and V. As shown in FIGS. 1A, 1B, and 1C, common YUV formats include the following formats, where a cross shown in FIGS. 1A, 1B, and 1C indicates a luminance component sampling point, and a circle indicates each chrominance component sampling point: a 4:4:4 format: indicating that no downsampling is performed on a chrominance component; a 4:2:2 format: indicating that 2:1 horizontal downsampling is performed on a chrominance component relative to a luminance component, but no vertical downsampling is performed, where for every two U sampling points or V sampling points, each scan line includes four Y sampling points; and a 4:2:0 format: indicating that 2:1 horizontal downsampling and 2:1 vertical downsampling are performed on a chrominance component relative to a luminance component.

In a case where a video image uses a YUV4:2:0 format, if a luminance component of an image block is an image block with a size of 2N×2N, a chrominance component of the image block is an image block with a size of N×N. In the embodiments of the present disclosure, the technical solutions of the present disclosure are described using the 4:2:0 format as an example. However, it may be understood that, in addition to the YUV4:2:0 format, the technical solutions of the present disclosure may also be applied to other YUV formats, or mutual prediction between different components in other video image formats, such as a red green blue (RGB) format. In another aspect, a current block may be a square block, or may be a non-square rectangular block or an area in another shape, to which the technical solutions provided in the embodiments of the present disclosure are also applicable.

For convenience of description, in the embodiments of the present disclosure, expressions such as a first signal component and a second signal component are used. If an image signal includes a luminance signal component and a chrominance signal component, the first signal component may be a chrominance component, and the second signal component may be a luminance component; if the image signal includes three signal components red (R), green (G), and blue (B), the first signal component may be any signal component in the three signal components R, G, and B, and the second signal component may be a signal component different from the first signal component in the three signal components R, G, and B; and if the image signal is decomposed into a plurality of signal components in another manner, the first signal component and the second signal component may be specified using a similar method.

In the embodiments of the present disclosure, because two chrominance components can be predicted from a luminance component using a same method, the technical solutions according to the embodiments of the present disclosure may be described in the following using L to indicate a luminance component and using C to indicate any one of chrominance components. A predicted value of any chrominance component sampling point may be obtained by mapping a reconstructed value of a luminance component sampling point at a same position according to a correlation function relation $f(x)$. When there is no luminance component sampling point at the same position corresponding to a chrominance component sampling point (a position relation between a luminance component sampling point and a chrominance component sampling point in the YUV 4:2:0 format as shown in FIG. 1C), a luminance component may be first re-sampled to a position of the chrominance component sampling point to obtain L', and then prediction is performed, as shown in Formula (2.1). In this case, each chrominance component sampling point has one luminance component value and one chrominance component value.

$$\text{Sample}_C^{pred}[j,i] = f(\text{Sample}'_L[j,i]) \tag{2.1}$$

Herein, the correlation function relationship $f(x)$ is used to express a correlation model from a luminance component value to a chrominance component value of a sampling point, and it may be a linear function, or may be another function such as a quadratic polynomial. The embodiments of the present disclosure are described using a linear function model shown in Formula (2.2) as an example. Parameters $\alpha$ and $\beta$ of the linear model may be obtained through calculation according to reconstructed values of a group of luminance component sampling points and chrominance component sampling points.

$$f(x) = \alpha x + \beta \tag{2.2}$$

The group of selected sampling points used for calculating the parameters $\alpha$ and $\beta$ is called a template in the embodiments of the present disclosure. In the embodiments of the present disclosure, as shown in FIG. 2, an L-type template is used for an LM mode. The LM mode is a prediction mode for calculating a predicted value of a first component sampling point of a current block based on reconstructed values of first adjacent signal component sampling points above and on the left side of the current block, reconstructed values of second adjacent signal component sampling points above and on the left side of the current block, and a reconstructed value of a second component sampling point of the current block.

Figure 3B:
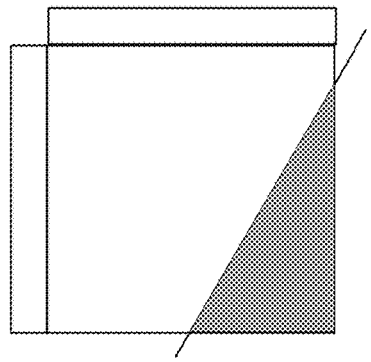

The accuracy of the parameters α and β directly influences the accuracy of the predicted value of the chrominance component sampling point. The L-type template used for the foregoing LM mode includes only N adjacent points right above the current block and N adjacent points on the left side of the current block. Generally, the L-type template is effective. For example, an image block shown in FIG. 3A includes two objects, which have different chrominance components (a grey area and a white area represent two objects). However, in the L-type template, a plurality of sampling points belongs to a same object as a part of sampling points in the current block. In this case, correlation between a luminance component and a chrominance component derived from the sampling points in the L-type template is quite similar to correlation between components in the current block. Therefore, a value of a chrominance component sampling point in the current block can be accurately predicted, based on the foregoing linear relation, from a reconstructed value of a luminance component sampling point. However, if the two objects in the current block are distributed as shown in FIG. 3B (a grey area and a white area represent two objects with different chrominance components), that is, no sampling point in the L-type template belongs to a same object as a sampling point in the grey area, in this case, the parameters α and β obtained through calculation cannot indicate correlation between a luminance component and a chrominance component of the grey area. As a result, a value of a chrominance component sampling point of the grey area cannot be accurately predicted using a linear relation derived in this case.

To accurately predict a value of a chrominance component sampling point in a current block, the embodiments of the present disclosure provide two new prediction modes, that is, an LMA mode and an LML mode.

Figure 4:
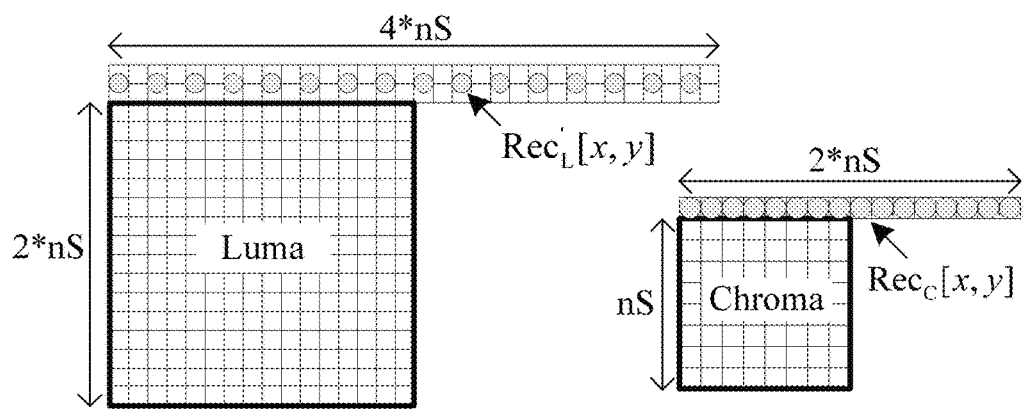
FIG. 4 is a schematic diagram of a template used for an LMA mode.

As shown in FIG. 4, the LMA mode is a prediction mode for calculating a predicted value of a first component sampling point of a current block based on a reconstructed value of a first adjacent signal component sampling point above the current block, a reconstructed value of a second adjacent signal component sampling point above the current block, and a reconstructed value of a second component sampling point of the current block.

In the embodiment of the present disclosure, the calculating the predicted value of the first component sampling point of the current block based on the reconstructed value of the first adjacent signal component sampling point above the current block, the reconstructed value of the second adjacent signal component sampling point above the current block, and the reconstructed value of the second component sampling point of the current block is only calculating the predicted value of the first component sampling point of the current block based on the reconstructed value of the first adjacent signal component sampling point above the current block, the reconstructed value of the second adjacent signal component sampling point above the current block, and the reconstructed value of the second component sampling point of the current block, that is, sampling points on the left side and on the lower left of the current block are not used in a process of calculating the predicted value of the first component sampling point of the current block.

Figure 5:
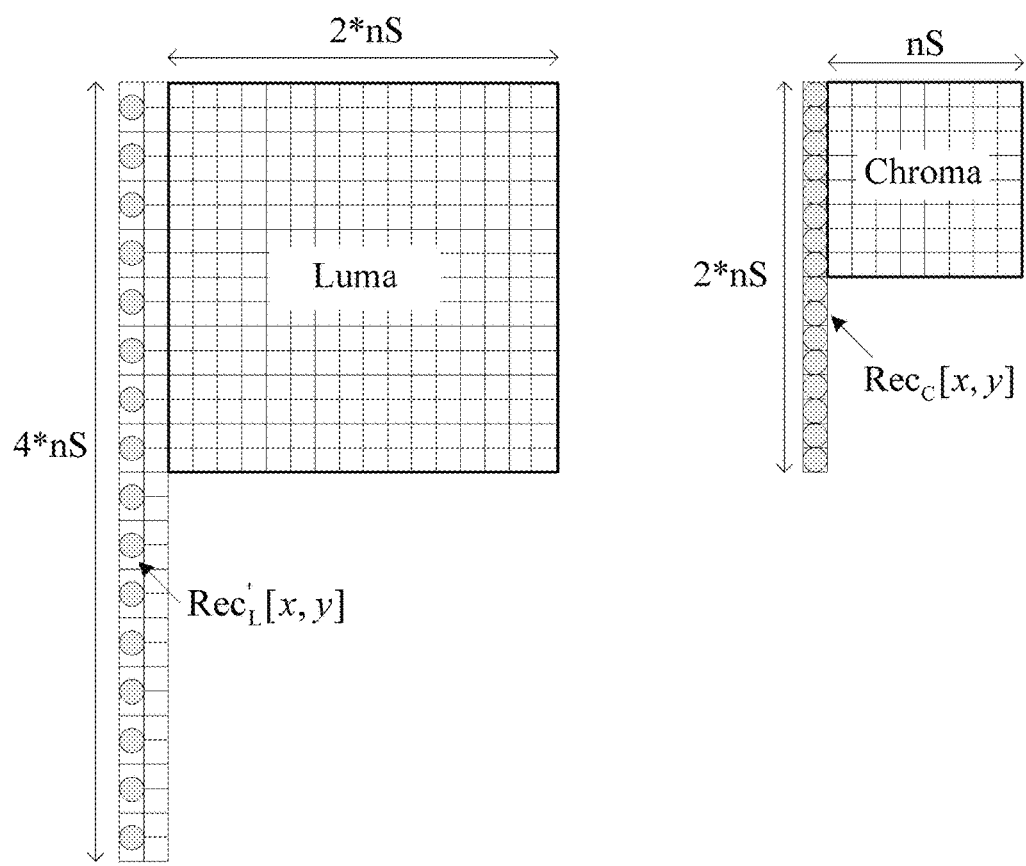
FIG. 5 is a schematic diagram of a template used for an LML mode.

As shown in FIG. 5, the LML mode is a prediction mode for calculating a predicted value of a first component sampling point of a current block based on a reconstructed value of a first adjacent signal component sampling point on the left side of the current block, a reconstructed value of a second adjacent signal component sampling point on the left side of the current block, and a reconstructed value of a second component sampling point of the current block.

In the embodiment of the present disclosure, the calculating the predicted value of the first component sampling point of the current block based on the reconstructed value of the first adjacent signal component sampling point on the left side of the current block, the reconstructed value of the second adjacent signal component sampling point on the left side of the current block, and the reconstructed value of the second component sampling point of the current block is only calculating the predicted value of the first component sampling point of the current block based on the reconstructed value of the first adjacent signal component sampling point on the left side of the current block, the reconstructed value of the second adjacent signal component sampling point on the left side of the current block, and the reconstructed value of the second component sampling point of the current block, that is, sampling points right above and on the upper right of the current block are not used in a process of calculating the predicted value of the first component sampling point of the current block.

In the following, with reference to FIG. 4, a prediction method for a signal component sampling point of an image block provided in an embodiment of the present disclosure is described as follows: calculating, based on a correlation model, a predicted value of a first signal component sampling point of a current block according to a reconstructed value of a second signal component sampling point of the current block and a parameter of the correlation model, where the parameter of the correlation model is obtained through calculation according to a reconstructed value of a first adjacent signal component sampling point above the current block and a reconstructed value of a second adjacent signal component sampling point above the current block.

As described above, in the embodiment of the present disclosure, a first signal component may be a chrominance component, and a second signal component may be a luminance component. In the following, the chrominance component and the luminance component are used as an example for description. In the embodiment of the present disclosure, the correlation model may be a linear model, or may be a quadratic polynomial model or another correlation model.

In the embodiment of the present disclosure, the term "above" in "above the current block" may be right above, or upper left, or upper right, or a combination of right above, upper left and upper right.

It may be understood that, adjacent signal component sampling points above the current block may be all adjacent sampling points above the current block, or a part of adjacent sampling points above the current block, for example, a part of sampling points right above and a part of sampling points on the upper left of the current block are selected.

In the embodiment of the present disclosure, a size of a chrominance component image of the current block is nS, a value of an adjacent chrominance component sampling point above the current block is $Rec_C[x, y]$, a reconstructed value of a luminance component sampling point of the current block is $Rec_L[x, y]$, and a reconstructed value of an adjacent luminance component sampling point above the current block is $Rec_L[x, y]$, where values of $[x,y]$ in the two $Rec_L[x, y]$ are different. Output of the embodiment of the present disclosure is a predicted value $Pred_C[x, y]$ of a chrominance component sampling point.

The foregoing values of the sampling points are obtained through reconstruction in a decoding operation before this process. Because a patent technology is described using a square block as an example in the present disclosure, that the size of the chrominance component image of the current block is nS indicates that the chrominance component image of the current block includes nS×nS sampling points.

This procedure includes the following steps.

S401: Perform a re-sampling operation on a reconstructed value of a luminance component sampling point of a current block and a reconstructed value of an adjacent luminance component sampling point outside the current block, to obtain a reconstructed value $Rec'_L[x,y]$ of a luminance component sampling point at a position of a chrominance component sampling point of the current block, where the reconstructed value $Rec_L[x,y]$ is obtained after re-sampling, $[x,y]$ indicates coordinates of the chrominance component sampling point, and a sampling point in an upper left corner of the current block may be selected as an origin of the coordinates. Definitely, if a reconstructed value of a luminance component sampling point exists at the position of the chrominance component sampling point of the current block, the re-sampling operation is not required.

A re-sampling method is related to a sampling format of a video image signal. A purpose of re-sampling is to obtain a sampling value of a luminance component at the position of the chrominance component sampling point of the current block. As shown in FIG. 4, for a re-sampling manner used for the YUV4:2:0 format, a calculation method is as follows.

$$Rec'_L[x,y]=(Rec_L[2x,2y]+Rec_L[2x,2y+1])\gg 1$$

where $(x, y) \in \{(x, y)|x=0, \ldots, 2*nS-1; y=-1\} \cup \{(x, y)|x, y=0, \ldots, nS-1\}$. (2.3)

$\{(x, y)|x=0, \ldots, 2*nS-1; y=-1\}$ indicates an adjacent chrominance component sampling point above the current block, $\{(x, y)|x, y=0, \ldots, nS-1\}$ indicates the chrominance component sampling point of the current block, and $Rec'_L[x,y]$ indicates a luminance component sampling value at the position of the chrominance component sampling point of the current block, where the luminance component sampling value is obtained after re-sampling.

In addition to the foregoing re-sampling method, another re-sampling method may also be adopted.

The foregoing adjacent chrominance component sampling point $\{(x, y)|x=0, \ldots, 2*nS-1; y=-1\}$ above the current block forms a template for the LMA mode. Reconstructed values of luminance components and reconstructed values of chrominance components of all sampling points in the template are used for calculating parameters $\alpha$ and $\beta$ in a linear model.

S402: Calculate the parameters $\alpha$ and $\beta$ in the linear model.

A linear regression technique is used to calculate the parameters $\alpha$ and $\beta$ in the linear model. Formulas (2.4) and (2.5) show an implementation method.

$$\alpha = \frac{I*LC - C*L}{I*LL - L^2} \quad (2.4)$$

$$\beta = \frac{C - \alpha*L}{I} \quad (2.5)$$

where I indicates the number of sampling points in the template, L indicates a sum of reconstructed values of all luminance component sampling points in the template, C indicates a sum of reconstructed values of all chrominance component sampling points in the template, LL indicates a quadratic sum of the reconstructed values of all the luminance component sampling points in the template, and LC indicates a sum of products of the reconstructed values of all the luminance component sampling points and the reconstructed values of all the chrominance component sampling points in the template. L, C, LL, and LC may be obtained through calculation using Formulas (2.6), (2.7), (2.8), and (2.9).

$$L = \sum_{x=0}^{2*nS-1} Rec'_L[x, -1] \quad (2.6)$$

$$C = \sum_{x=0}^{2*nS-1} Rec_C[x, -1] \quad (2.7)$$

$$LL = \sum_{x=0}^{2*nS-1} Rec'_L[x, -1]^2 \quad (2.8)$$

$$LC = \sum_{x=0}^{2*nS-1} Rec'_L[x, -1] * Rec_C[x, -1] \quad (2.9)$$

S403: Calculate a predicted value $Pred_C[x,y]$ of the chrominance component sampling point of the current block.

By substituting the parameters $\alpha$ and $\beta$ obtained through calculation into the linear model, the predicted value $Pred_C[x, y]$ of the chrominance component sampling point of the current block can be obtained through calculation based on the luminance component sampling value $Rec'_L[x, y]$ at the position of the chrominance component sampling point of the current block, where the luminance component sampling value $Rec'_L[x, y]$ is obtained after re-sampling. An implementation manner is shown in Formula (2.10).

$$Pred_C[x, y]=\alpha*Rec'_L[x, y]+\beta$$

where $x,y=0, \ldots, nS-1$. (2.10)

In the following, with reference to FIG. 5, a prediction method for a signal component sampling point of an image block provided in an embodiment of the present disclosure is described as follows: calculating, based on a correlation model, a predicted value of a first signal component sampling point of a current block according to a reconstructed value of a second signal component sampling point of the current block and a parameter of the correlation model, where the parameter of the correlation model is obtained through calculation according to a reconstructed value of a first adjacent signal component sampling point on the left side of the current block and a reconstructed value of a second adjacent signal component sampling point on the left side of the current block.

As described above, in the embodiment of the present disclosure, a first signal component may be a chrominance component, and a second signal component may be a luminance component. In the following, the chrominance component and the luminance component are used as an example for description. In the embodiment of the present disclosure, the correlation model may be a linear model, or may be a quadratic polynomial model or another correlation model.

In the embodiment of the present disclosure, the term "left side" in "on the left side of the current block" may be left, or upper left, or lower left, or a combination of left, upper left and lower left.

It may be understood that, adjacent signal component sampling points on the left side of the current block may be all adjacent sampling points on the left side of the current block, or a part of adjacent sampling points on the left side of the current block, for example, a part of sampling points on the left of and a part of sampling points on the upper left of the current block are selected.

In the embodiment of the present disclosure, a size of a chrominance component image of the current block is nS, a value of an adjacent chrominance component sampling point on the left side of the current block is $Rec_C[x,y]$, a reconstructed value of a luminance component sampling point of the current block is $Rec_L[x, y]$, and a reconstructed value of an adjacent luminance component sampling point on the left side of the current block is $Rec_L[x, y]$, where values of $[x,y]$ in the two $Rec_L[x, y]$ are different. Output of the embodiment of the present disclosure is a predicted value $Pred_C[x, y]$ a chrominance component sampling point.

The foregoing values of the sampling points are obtained through reconstruction in a decoding operation before this process. Because a patent technology is described using a square block as an example in the present disclosure, that the size of the chrominance component image of the current block is nS indicates that the chrominance component image of the current block includes nS×nS sampling points.

This procedure includes the following steps.

S501: Perform a re-sampling operation on a reconstructed value of a luminance component sampling point of a current block and a reconstructed value of an adjacent luminance component sampling point outside the current block, to obtain a luminance component sampling value $Rec'_L[x,y]$ value at a position of a chrominance component sampling point of the current block, where the luminance component sampling value $Rec'_L[x,y]$ is obtained after re-sampling, $[x,y]$ indicates coordinates of the chrominance component sampling point, and a sampling point in an upper left corner of the current block may be selected as an origin of the coordinates. Definitely, if a reconstructed value of a luminance component sampling point exists at the position of the chrominance component sampling point of the current block, the re-sampling operation is not required.

A re-sampling method is related to a sampling format of a video image signal. A purpose of re-sampling is to obtain a reconstructed value of a luminance component sampling point at the position of the chrominance component sampling point of the current block. As shown in FIG. 5, for a re-sampling manner used for the YUV4:2:0 format, a calculation method is as follows:

$Rec'_L[x,y]=(Rec_L[2x,2y]+Rec_L[2x,2y+1])>>1$ where $(x, y) \in \{(x, y)|x=-1; y=0, \ldots, 2*nS-1\} \cup \{(x, y)|x, y=0, \ldots, nS-1\}$. (2.11)

$\{(x, y)|x=-1; y=0, \ldots, 2*nS-1\}$ indicates an adjacent chrominance component sampling point on the left side of the current block, $\{(x, y)|x, y=0, \ldots, nS-1\}$ indicates the chrominance component sampling point of the current block, and $Rec'_L[x,y]$ indicates the luminance component sampling value at the position of the chrominance component sampling point of the current block, where the luminance component sampling value is obtained after re-sampling.

In addition to the foregoing re-sampling method, another re-sampling method may also be adopted.

The foregoing adjacent chrominance component sampling point $\{(x, y)|x=-1; y=0, \ldots, 2*nS-1\}$ on the left side of the current block forms a template for the LML mode. Reconstructed values of luminance components and reconstructed values of chrominance components of all sampling points in the template are used for calculating parameters $\alpha$ and $\beta$ in a linear model.

S502: Calculate the parameters $\alpha$ and $\beta$ in the linear model.

A linear regression technique is used to calculate the parameters $\alpha$ and $\beta$ in the linear model. Formulas (2.4) and (2.5) show an implementation method.

$$\alpha = \frac{I*LC - C*L}{I*LL - L^2} \quad (2.4)$$

$$\beta = \frac{C - \alpha*L}{I} \quad (2.5)$$

where I indicates the number of sampling points in the template, L indicates a sum of reconstructed values of all luminance component sampling points in the template, C indicates a sum of reconstructed values of all chrominance component sampling points in the template, LL indicates a quadratic sum of the reconstructed values of all the luminance component sampling points in the template, and LC indicates a sum of products of the reconstructed values of all the luminance component sampling points and the reconstructed values of all the chrominance component sampling points in the template. L, C, LL, and LC may be obtained through calculation using Formulas (2.12), (2.13), (2.14), and (2.15).

$$L = \sum_{y=0}^{2*nS-1} Rec'_L[-1, y] \quad (2.12)$$

$$C = \sum_{y=0}^{2*nS-1} Rec_C[-1, y] \quad (2.13)$$

$$LL = \sum_{y=0}^{2*nS-1} Rec'_L[-1, y]^2 \quad (2.14)$$

$$LC = \sum_{y=0}^{2*nS-1} Rec'_L[-1, y]*Rec_C[-1, y] \quad (2.15)$$

S503: Calculate a predicted value $Pred_C[x,y]$ of the chrominance component sampling point of the current block.

By substituting the parameters $\alpha$ and $\beta$ obtained through calculation into the linear model, the predicted value $Pred_C[x, y]$ of the chrominance component sampling point of the current block can be obtained through calculation based on the luminance component sampling value $Rec'_L[x, y]$ at the position of the chrominance component sampling point of the current block, where the luminance component sampling value $Rec'_L[x, y]$ is obtained after re-sampling. An implementation manner is shown in Formula (2.10).

$Pred_C[x, y]=\alpha*Rec'_L[x, y]+\beta$ where $x,y=0, \ldots, nS-1$. (2.10)

In the following, with reference to FIG. 6, an intra-frame decoding method for a signal component sampling point of an image block provided in an embodiment of the present disclosure is described.

S601: Obtain, from a video code stream, prediction mode information of a first signal component of a current block.

S602: Determine a prediction mode of the first signal component of the current block from a prediction mode set of the first signal component of the current block according to the prediction mode information of the first signal component of the current block, where the prediction mode set of the first signal component of the current block includes at least one of an LMA mode and an LML mode.

As described above, in the embodiment of the present disclosure, the first signal component may be a chrominance component, and a second signal component may be a luminance component. In the following, the chrominance component and the luminance component are used as an example for description.

In the embodiment of the present disclosure, the chrominance component of the current block may have its own independent chrominance prediction mode, or may share a same chrominance prediction mode with a chrominance component of an adjacent image block. For example, in an existing HEVC encoding and decoding solution, each predicting unit has an independent prediction mode, and one predicting unit may include one or more transform units. In an encoding and decoding process of a chrominance component, a prediction operation is performed for the current block based on the transform unit. If one predicting unit includes only one transform unit, the transform unit has its own independent prediction mode; and if one predicting unit includes a plurality of transform units, the plurality of transform units uses a same prediction mode.

A decoding end may adopt an adaptive arithmetic entropy decoding method, variable length decoding, fixed length decoding or another entropy decoding method to obtain, from a code stream, prediction mode information of a chrominance component, where the prediction mode information is expressed by a code word, and then determine a prediction mode of a chrominance component of a current predicting unit according to correspondence between a code word and a prediction mode, so as to determine a prediction mode of a chrominance component of a transform unit in the predicting unit, that is, the current block. Specifically, which entropy decoding method to be adopted depends on a code word designing method of an intra-frame prediction mode for chrominance. A code table shown in Table 1 shows correspondence between an available code word and a prediction mode of a chrominance component.

TABLE 1

Code table of a prediction mode of a chrominance component

| Code Word | Prediction Mode of Chrominance Component |
|---|---|
| 0 | DM mode |
| 101 | LM mode |
| 1001 | LMA mode |
| 1000 | LML mode |
| 110 | Planar mode |
| 1110 | Vertical mode |
| 11110 | Horizontal mode |
| 11111 | DC mode |

A code word of an original prediction mode of the chrominance component in the HEVC solution is a Truncated Unary (TU) code. In this embodiment, a code word 10 of the LM mode is extended, and in addition, suffix code words 1, 01, and 10 are added to distinguish the LM mode, a newly added LMA mode, and an LML mode, so as to obtain the code table shown in Table 1. Obviously, other code words may also be selected for the LMA mode and the LML mode to form a new code table. In addition, a single TU code, a Huffman code, a fixed length code or another code word, or a combined code word with different code words may also be adopted to specify a corresponding code word for all prediction modes of the chrominance component, so as to form a new code table.

For the code table shown in Table 1, it may be considered that the prediction mode set of the first signal component of the current block includes: the DM mode, the LM mode, the LMA mode, the LML mode, the planar mode, the vertical mode, the horizontal mode, and the DC mode.

S603: Obtain a predicted value of a first signal component sampling point of the current block according to the prediction mode of the first signal component of the current block.

In the embodiment of the present disclosure, if the prediction mode of the first signal component of the current block that is determined from the prediction mode set of the first signal component of the current block according to the prediction mode information of the first signal component of the current block is the LMA mode, the obtaining a predicted value of a first signal component sampling point of the current block according to the prediction mode of the first signal component of the current block includes calculating, based on a correlation model, the predicted value of the first signal component sampling point of the current block according to a reconstructed value of a second signal component sampling point of the current block and a parameter of the correlation model, where the parameter of the correlation model is obtained through calculation according to a reconstructed value of a first adjacent signal component sampling point above the current block and a reconstructed value of a second adjacent signal component sampling point above the current block.

If the prediction mode of the first signal component of the current block that is determined from the prediction mode set of the first signal component of the current block according to the prediction mode information of the first signal component of the current block is the LML mode, the obtaining a predicted value of a first signal component sampling point of the current block according to the prediction mode of the first signal component of the current block includes calculating, based on a correlation model, the predicted value of the first signal component sampling point of the current block according to a reconstructed value of a second signal component sampling point of the current block and a parameter of the correlation model, where the parameter of the correlation model is obtained through calculation according to a reconstructed value of a first adjacent signal component sampling point on the left side of the current block and a reconstructed value of a second adjacent signal component sampling point on the left side of the current block.

A specific prediction method has been described in detail in the embodiments shown in FIG. 4 and FIG. 5, and is not described herein again.

S604: Obtain a reconstructed value of the first signal component sampling point of the current block according to the predicted value of the first signal component sampling point of the current block.

A reconstructed value of a chrominance component sampling point of the current block is calculated based on an obtained predicted value of the chrominance component sampling point of the current block and a residual value of the chrominance component sampling point of the current block, where the residual value is obtained through reconstruction. The residual value of the chrominance component sampling point of the current block may be obtained based on residual information of the chrominance component sampling point of the current block, where the residual information is obtained from a video code stream. The H.264/AVC standard or a method in the existing HEVC solution may be adopted to reconstruct the residual value of the chrominance component sampling point of the current block, which is not described herein again.

In some implementation manners, another code table may be adopted in S602, and a code table shown in Table 2 shows correspondence between an available code word and a prediction mode of a chrominance component.

TABLE 2

Code table of a prediction mode of a chrominance component

| Code Word | Prediction Mode of Chrominance Component |
|---|---|
| 0 | DM mode |
| 10 | LM mode |
| 110 | LMA mode |
| 111 | LML mode |

Code words of original six prediction modes of the chrominance component in the HEVC solution are TU codes. In this embodiment, four existing HEVC prediction modes are removed, and TU codes are used to design code words for the LMA, LML and other remaining modes. Obviously, the code table may also be redesigned by removing one or more other existing HEVC prediction modes, or adding a new suitable prediction mode. A new code table may adopt a single TU code, a Huffman code, a fixed length code or another code word, or a combined code word with different code words to specify a corresponding code word for all optional prediction modes of the chrominance component.

For the code table shown in Table 1, it may be considered that the prediction mode set of the first signal component of the current block includes the DM mode, the LM mode, the LMA mode, and the LML mode.

According to the technical solution provided in the embodiment of the present disclosure, by using a technical means of providing a prediction mode set including an LMA mode and an LML mode for a chrominance component, the accuracy of intra-frame prediction of a current block is improved.

In the following, with reference to FIG. 7, an intra-frame decoding method for a signal component sampling point of an image block provided in an embodiment of the present disclosure is described.

S701: Obtain, from a video code stream, prediction mode information of a first signal component of a current block.

S702: Determine a prediction mode of the first signal component of the current block from a prediction mode set of the first signal component of the current block according to the prediction mode information of the first signal component of the current block, where the prediction mode set of the first signal component includes a prediction mode based on a correlation model, and the prediction mode based on the correlation model is determined depending on a prediction mode of a second signal component of the current block.

In the embodiment of the present disclosure, the prediction mode based on the correlation model includes a prediction mode for calculating a predicted value of a first signal component sampling point of the current block using the correlation model according to a reconstructed value of a second signal component sampling point of the current block and a parameter of the correlation model; and the prediction mode based on the correlation model may include any one of the following prediction modes an LM mode, an LMA mode, and an LML mode.

In the embodiment of the present disclosure, a parameter of the correlation model of the LMA mode is obtained through calculation according to a reconstructed value of a first adjacent signal component sampling point above the current block and a reconstructed value of a second adjacent signal component sampling point above the current block; a parameter of the correlation model of the LML mode is obtained through calculation according to a reconstructed value of a first adjacent signal component sampling point on the left side of the current block and a reconstructed value of a second adjacent signal component sampling point on the left side of the current block; and a parameter of the correlation model of the LM mode is obtained through calculation according to the reconstructed values of the first adjacent signal component sampling points above and on the left side of the current block and the reconstructed values of the second adjacent signal component sampling points above and on the left side of the current block.

As described above, in the embodiment of the present disclosure, the first signal component may be a chrominance component, and the second signal component may be a luminance component. In the following, the chrominance component and the luminance component are used as an example for description.

In the embodiment of the present disclosure, the chrominance component of the current block may have its own independent chrominance prediction mode, or may share a same chrominance prediction mode with a chrominance component of an adjacent image block. For example, in an existing HEVC encoding and decoding solution, each predicting unit has an independent prediction mode, and one predicting unit may include one or more transform units. In a frame encoding and decoding process of a chrominance component, a prediction operation is performed for the current block based on the transform unit. If one predicting unit includes only one transform unit, the transform unit has its own independent prediction mode; and if one predicting unit includes a plurality of transform units, the plurality of transform units uses a same prediction mode.

A decoding end may adopt an adaptive arithmetic entropy decoding method, variable length decoding, fixed length decoding or another entropy decoding method to obtain, from a code stream, prediction mode information of a chrominance component, where the prediction mode information is expressed by a code word, and then determine a prediction mode of a chrominance component of a current predicting unit according to correspondence between a code word and a prediction mode, so as to determine a prediction mode of a chrominance component of a transform unit in the predicting unit, that is, the current block. Specifically, which entropy decoding method to be adopted depends on a code word designing method of an intra-frame prediction mode for chrominance. A code table shown in Table 3 shows correspondence between an available code word and a prediction mode of a chrominance component.

TABLE 3

Code table of a prediction mode of a chrominance component

| Code Word | Prediction Mode of Chrominance Component |
|---|---|
| 0 | DM mode |
| 101 | First mode |
| 100 | Second mode |
| 110 | Planar mode |
| 1110 | Vertical mode |
| 11110 | Horizontal mode |
| 11111 | DC mode |

In the embodiment of the present disclosure, the first mode or the second mode is a prediction mode based on a correlation model, and may be one of the LM mode, the LML mode, and the LMA mode. When it is determined that the prediction mode of the chrominance component is the first mode or the second mode, a prediction mode indicated by the first mode or the second mode needs to be obtained based on a preset mapping table according to a prediction mode of a luminance component of the current block. The foregoing mapping table is used at both an encoding end and a decoding end. For example, the prediction modes indicated by the first mode and the second mode may be determined based on a mapping shown in Table 4 according to the prediction mode of the luminance component. Obviously, the mapping has a plurality of combinations, and is not limited to Table 4.

TABLE 4

Mapping between the prediction mode of the luminance component and the first mode and the second mode

| Intra-frame Prediction Mode for Luminance | First Mode | Second Mode |
|---|---|---|
| Vertical mode | LM mode | LMA mode |
| Horizontal mode | LM mode | LML mode |
| DC mode | LM mode | LML mode |
| Another intra-frame prediction mode | LML mode | LMA mode |

A code word of an original prediction mode of the chrominance component in the HEVC solution is a TU code. In this embodiment, a code word 10 of the LM mode is extended, and in addition, suffix code words 1 and 0 are added to distinguish the first mode from the second mode, so as to obtain the code table shown in Table 3. Obviously, other code words may be selected for the first mode and the second mode to form a new code table, and a single TU code, a Huffman code, a fixed length code or another code word, or a combined code word with different code words may also be adopted to specify a corresponding code word for all optional prediction modes of the chrominance component, so as to form a new code table.

For convenience of understanding, in the embodiment of the present disclosure, possible methods of determining the prediction mode of the chrominance component of the current block are briefly described using examples. For example, in some implementation manners, if it is determined, according to the prediction mode information of the chrominance component, that the prediction mode of the chrominance component of the current block is a prediction mode based on a correlation model, that is, the first mode or the second mode shown in Table 3, the prediction mode of the chrominance component of the current block is determined based on Table 4 according to the prediction mode of the luminance component of the current block. For another example, in some implementation manners, the first mode and the second mode shown in Table 3 may also be determined based on Table 4 according to the prediction mode of the luminance component of the current block, and in this case, the prediction mode of the chrominance component of the current block may be determined directly according to the prediction mode information of the chrominance component.

For the code table shown in Table 3, it may be considered that the prediction mode set of the first signal component of the current block includes at least one prediction mode of the DM mode, the planar mode, the vertical mode, the horizontal mode, the DC mode, and the prediction mode based on the correlation model.

S703: Obtain a predicted value of a first signal component sampling point of the current block according to the prediction mode of the first signal component of the current block.

In the embodiment of the present disclosure, if the prediction mode of the first signal component of the current block that is determined from the prediction mode set of the first signal component of the current block according to the prediction mode information of the first signal component of the current block is the LMA mode, the obtaining a predicted value of a first signal component sampling point of the current block according to the prediction mode of the first signal component of the current block includes calculating, based on the correlation model, the predicted value of the first signal component sampling point of the current block according to the reconstructed value of the second signal component sampling point of the current block and the parameter of the correlation model, where the parameter of the correlation model is obtained through calculation according to the reconstructed value of the first adjacent signal component sampling point above the current block and the reconstructed value of the second adjacent signal component sampling point above the current block.

If the prediction mode of the first signal component of the current block that is determined from the prediction mode set of the first signal component of the current block according to the prediction mode information of the first signal component of the current block is the LML mode, the obtaining a predicted value of a first signal component sampling point of the current block according to the prediction mode of the first signal component of the current block includes calculating, based on the correlation model, the predicted value of the first signal component sampling point of the current block according to the reconstructed value of the second signal component sampling point of the current block and the parameter of the correlation model, where the parameter of the correlation model is obtained through calculation according to the reconstructed value of the first adjacent signal component sampling point on the left side of the current block and the reconstructed value of the second adjacent signal component sampling point on the left side of the current block.

A specific prediction method has been described in detail in the embodiments shown in FIG. 4 and FIG. 5, and is not described herein again.

S704: Obtain a reconstructed value of the first signal component sampling point of the current block according to the predicted value of the first signal component sampling point of the current block.

A reconstructed value of a chrominance component sampling point of the current block is calculated based on an obtained predicted value of the chrominance component sampling point of the current block and a residual value of the chrominance component sampling point of the current block, where the residual value is obtained through reconstruction. The residual value of the chrominance component sampling point of the current block may be obtained based on residual information of the chrominance component sampling point of the current block, where the residual information is obtained from a video code stream. The H.264/AVC standard or a method in the existing HEVC solution may be adopted to reconstruct the residual value of the chrominance component sampling point of the current block, which is not described herein again.

In some implementation manners, another code table may be adopted in S702, and a code table shown in Table 5 shows correspondence between an available code word and a prediction mode of a chrominance component.

TABLE 5

Code table of a prediction mode of a chrominance component

| Code Word | Prediction Mode of Chrominance Component |
|---|---|
| 0 | DM mode |
| 10 | First mode |
| 110 | Planar mode |
| 1110 | Vertical mode |
| 11110 | Horizontal mode |
| 11111 | DC mode |

In the embodiment of the present disclosure, the first mode is a prediction mode based on a correlation model, and may be one of the LM mode, the LML mode, and the LMA mode. When it is determined that the prediction mode of the chrominance component is the first mode, a prediction mode indicated by the first mode needs to be determined based on a preset mapping table according to a prediction mode of a luminance component of the current predicting unit. The foregoing mapping table is used at both an encoding end and a decoding end. Table 6 shows a mapping between an available prediction mode of the luminance component and the first mode. Obviously, the mapping has a plurality of combinations, and is not limited to Table 6.

TABLE 6

Mapping between the prediction mode of the luminance component and the first mode

| Prediction Mode of Luminance Component | First Mode |
|---|---|
| Vertical mode | LMA mode |
| Horizontal mode | LML mode |
| DC mode | LML mode |
| Another intra-frame prediction mode | LM mode |

A code word of an original prediction mode of the chrominance component in the HEVC solution is a TU code. In this embodiment, code words of all the optional prediction modes of the chrominance component still use TU codes. Obviously, a single Huffman code, a fixed length code or another code word, or a combined code word with different code words may also be adopted to specify a corresponding code word for all the optional prediction modes of chrominance component, so as to form a new code table.

For convenience of understanding, in the embodiment of the present disclosure, possible methods of determining the prediction mode are briefly described using examples. For example, in some implementation manners, if it is determined, according to the prediction mode information of the chrominance component, that the prediction mode of the chrominance component of the current block is a prediction mode based on a correlation model, that is, the first mode shown in Table 5, the prediction mode of the chrominance component of the current block is determined based on Table 6 according to the prediction mode of the luminance component of the current block. For another example, in some implementation manners, the first mode shown in Table 5 may be determined based on Table 6 according to the prediction mode of the luminance component of the current block, and in this case, the prediction mode of the chrominance component of the current block may be determined directly according to the prediction mode information of the chrominance component.

For the code table shown in Table 5, it may be considered that the prediction mode set of the first signal component of the current block includes at least one prediction mode of the DM mode, the planar mode, the vertical mode, the horizontal mode, the DC mode, and the prediction mode based on the correlation model.

According to the technical solution provided in the embodiment of the present disclosure, by using a technical means of providing a prediction mode set including an LMA mode and an LML mode for a chrominance component, the accuracy of intra-frame prediction of a current block is improved.

With the technical solution provided in the embodiment of the present disclosure, the accuracy of intra-frame prediction of a current block is improved, and beneficial effects of the embodiment of the present disclosure are described in detail from the following two aspects.

Figure 8:
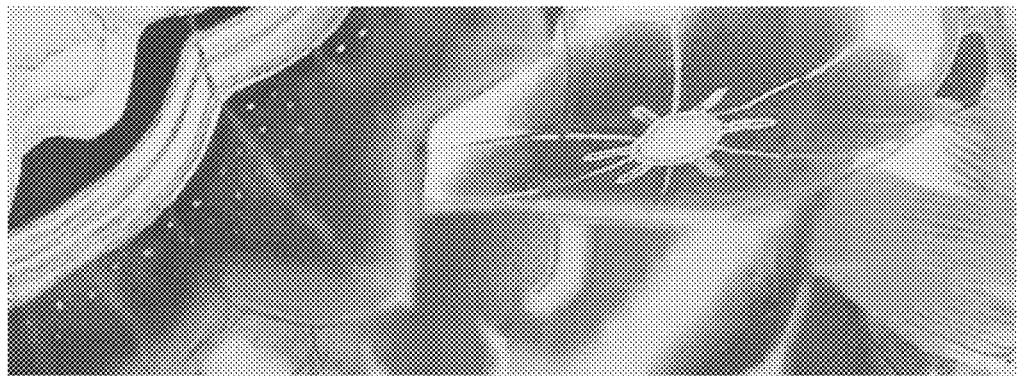
FIG. 8 is an effect diagram of a V component of a reconstructed image obtained using an embodiment of the present disclosure.
Figure 9:
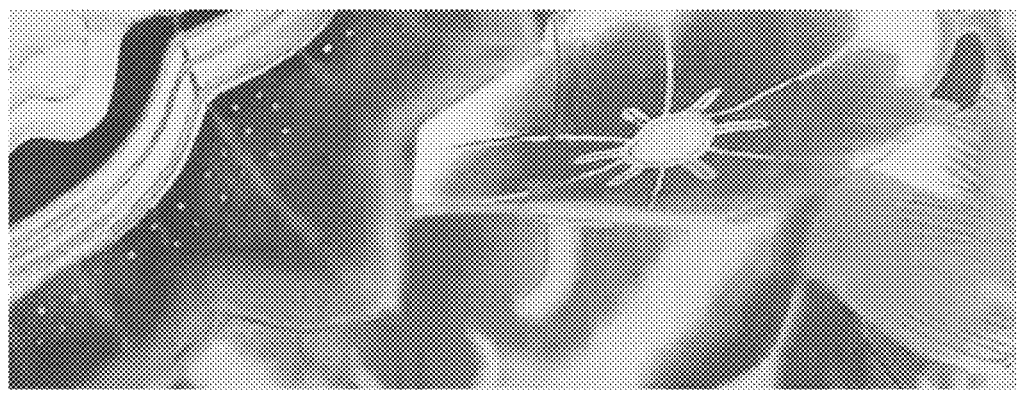
FIG. 9 is an effect diagram of a V component of a reconstructed image obtained using the HEVC technical solution.

The first aspect is a subjective aspect. FIG. 8 shows a V component of a reconstructed image obtained using the solution in the embodiment of the present disclosure, and FIG. 9 shows a V component of a reconstructed image obtained using an existing HEVC solution (that is, prediction modes of a chrominance component include only a DM mode, an LM mode, a horizontal mode, a vertical mode, a planar mode, and a DC mode). It can be seen by comparing FIG. 8 and FIG. 9 that the reconstructed image shown in FIG. 8 is sharper, and has clearer details. This is because two optional prediction modes of the chrominance component that are newly added in the embodiment of the present disclosure enable intra-frame prediction of the chrominance component to be more accurate, so that a prediction residual is smaller. Accordingly, distortion caused by quantization of the prediction residual is not obvious, thereby obtaining a better reconstructed image.

In the second aspect, comparison that uses a method for objectively evaluating Blue-ray Disc Bitrate (BD-Bitrate) shows that the embodiment of the present disclosure has better rate distortion performance. Specific data is shown in Table 7. Values shown in Table 7 indicate a percentage of a bit rate saved by the embodiment of the present disclosure, compared with the existing HEVC solution. If the percentage is negative, the bit rate is saved; and if the percentage is positive, the bit rate is increased.

TABLE 7

|  | All Intra HE | | | All Intra LC | | |
| --- | --- | --- | --- | --- | --- | --- |
|  | Y | U | V | Y | U | V |
| Class A | −0.2% | −9.1% | −9.9% | −0.1% | −9.3% | −10.1% |
| Class B | −0.1% | −2.7% | −2.2% | 0.0% | −2.8% | −2.2% |
| Class C | −0.2% | −2.3% | −2.9% | −0.1% | −2.2% | −2.7% |
| Class D | −0.1% | −2.0% | −2.2% | −0.1% | −2.0% | −2.2% |
| Class E | −0.1% | −1.5% | −1.8% | 0.0% | −1.9% | −1.8% |
| Class F | −0.3% | −2.6% | −2.9% | −0.2% | −2.2% | −2.6% |
| Overall | −0.2% | −3.4% | −3.6% | −0.1% | −3.4% | −3.6% |
|  | −0.2% | −3.4% | −3.6% | −0.1% | −3.4% | −3.5% |
| Enc Time [%] |  | 105% |  |  | 107% |  |
| Dec Time [%] |  | 100% |  |  | 100% |  |

Figure 10:
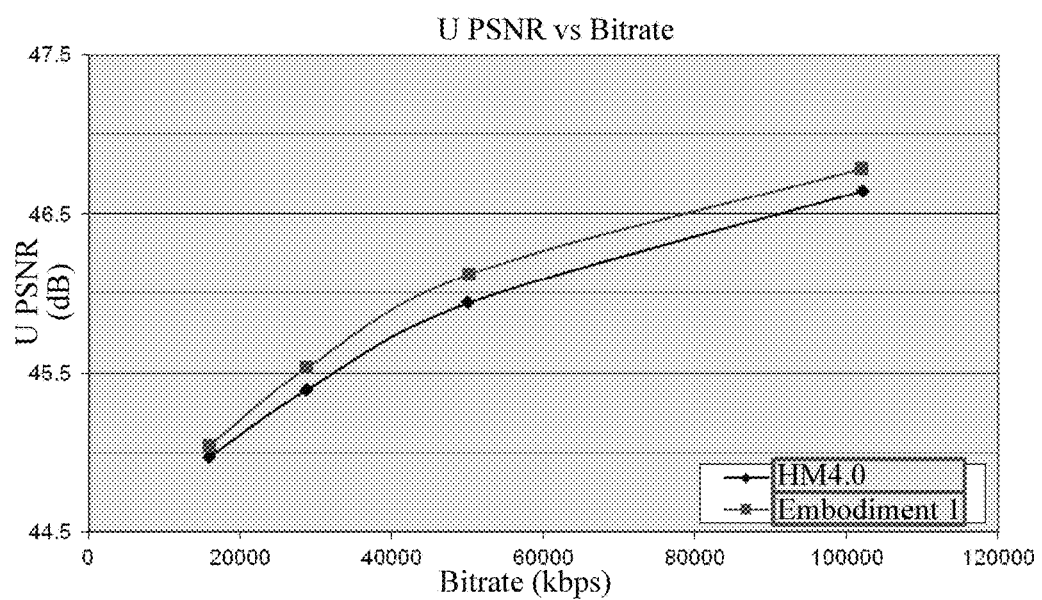
FIG. 10 is an effect diagram of a technical solution according to an embodiment of the present disclosure.

FIG. 10 is a rate-distortion diagram showing comparison of results of encoding a sequence SteamLocomotive using the embodiment of the present disclosure and the existing HEVC solution HEVC Test Model (HM) 4.0. It can be seen that, with the method provided in the present disclosure, encoding performance is definitely enhanced, and subjective quality is improved.

Figure 11:
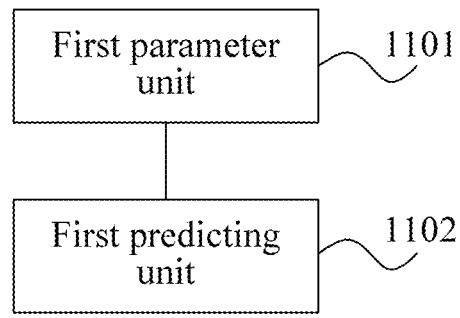
FIG. 11 is a schematic diagram of a prediction apparatus for a signal component sampling point of an image block according to an embodiment of the present disclosure.

As shown in FIG. 11, an embodiment of the present disclosure provides a prediction apparatus for a signal component sampling point of an image block, which includes a first parameter unit 1101 configured to obtain a parameter of a correlation model through calculation according to a reconstructed value of a first adjacent signal component sampling point above a current block and a reconstructed value of a second adjacent signal component sampling point above the current block; and a first predicting unit 1102 configured to calculate, based on the correlation model, a predicted value of a first signal component sampling point of the current block according to a reconstructed value of a second signal component sampling point of the current block and the parameter of the correlation model.

The apparatus provided in the embodiment of the present disclosure is configured to implement the method shown in FIG. 4, which is not described herein again.

Figure 12:
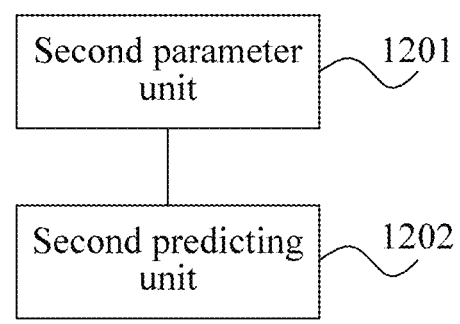
FIG. 12 is a schematic diagram of a prediction apparatus for a signal component sampling point of an image block according to another embodiment of the present disclosure.

As shown in FIG. 12, an embodiment of the present disclosure provides a prediction apparatus for a signal component sampling point of an image block, which includes a second parameter unit 1201 configured to obtain a parameter of a correlation model through calculation according to a reconstructed value of a first adjacent signal component sampling point on the left side of a current block and a reconstructed value of a second adjacent signal component sampling point on the left side of the current block; and a second predicting unit 1202 configured to calculate, based on the correlation model, a predicted value of a first signal component sampling point of the current block according to a reconstructed value of a second signal component sampling point of the current block and the parameter of the correlation model.

The apparatus provided in the embodiment of the present disclosure is configured to implement the method shown in FIG. 5, which is not described herein again.

Figure 13:
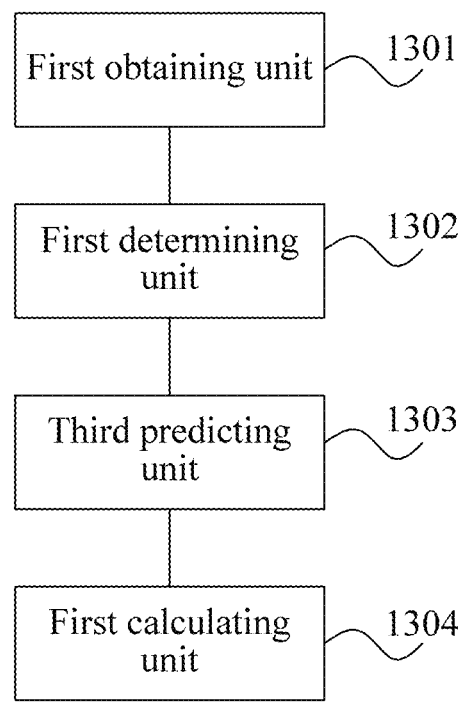
FIG. 13 is a schematic diagram of an intra-frame decoding apparatus for a signal component sampling point of an image block according to an embodiment of the present disclosure.

As shown in FIG. 13, an embodiment of the present disclosure provides an intra-frame decoding apparatus for a signal component sampling point of an image block, which includes a first obtaining unit 1301 configured to obtain, from a video code stream, prediction mode information of a first signal component of a current block; a first determining unit 1302 configured to determine a prediction mode of the first signal component of the current block from a prediction mode set of the first signal component of the current block according to the prediction mode information of the first signal component of the current block, where the prediction mode set of the first signal component of the current block includes at least one of an LMA mode and an LML mode; a third predicting unit 1303 configured to obtain a predicted value of a first signal component sampling point of the current block according to the prediction mode of the first signal component of the current block; and a first calculating unit 1304 configured to obtain a reconstructed value of the first signal component sampling point of the current block according to the predicted value of the first signal component sampling point of the current block.

Figure 6:
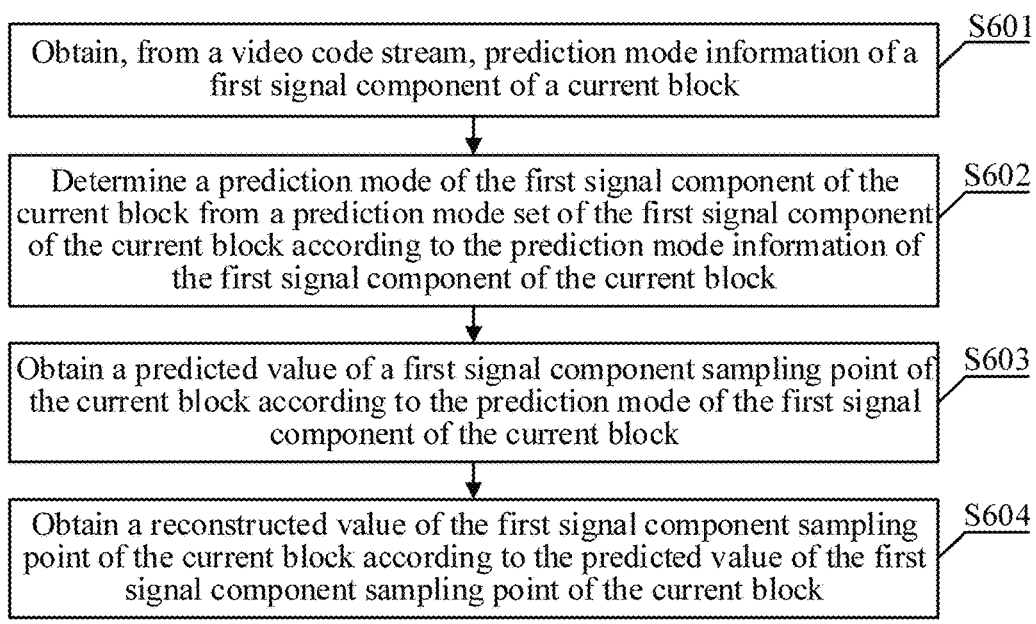
FIG. 6 is a flowchart of an intra-frame decoding method for a signal component sampling point of an image block according to an embodiment of the present disclosure.

The apparatus provided in the embodiment of the present disclosure is configured to implement the method shown in FIG. 6, which is not described herein again.

According to the apparatus provided in the embodiment of the present disclosure, by using a technical means of providing a prediction mode set including an LMA mode and an LML mode for a chrominance component, the accuracy of intra-frame prediction of a current block is improved.

Figure 14:
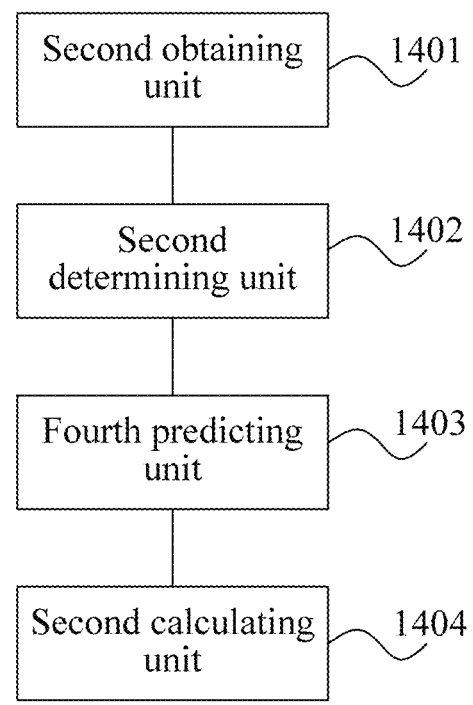
FIG. 14 is a schematic diagram of an intra-frame decoding apparatus for a signal component sampling point of an image block according to another embodiment of the present disclosure.

As shown in FIG. 14, an embodiment of the present disclosure provides an intra-frame decoding apparatus for a signal component sampling point of an image block, which includes a second obtaining unit 1401 configured to obtain, from a video code stream, prediction mode information of a first signal component of a current block; a second determining unit 1402 configured to determine a prediction mode of the first signal component of the current block from a prediction mode set of the first signal component of the current block according to the prediction mode information of the first signal component of the current block, where the prediction mode set of the first signal component includes a prediction mode based on a correlation model, and the prediction mode based on the correlation model is determined depending on a prediction mode of a second signal component of the current block; a fourth predicting unit 1403 configured to obtain a predicted value of a first signal component sampling point of the current block according to the prediction mode of the first signal component of the current block; and a second calculating unit 1404 configured to obtain a reconstructed value of the first signal component sampling point of the current block according to the predicted value of the first signal component sampling point of the current block.

Figure 7:
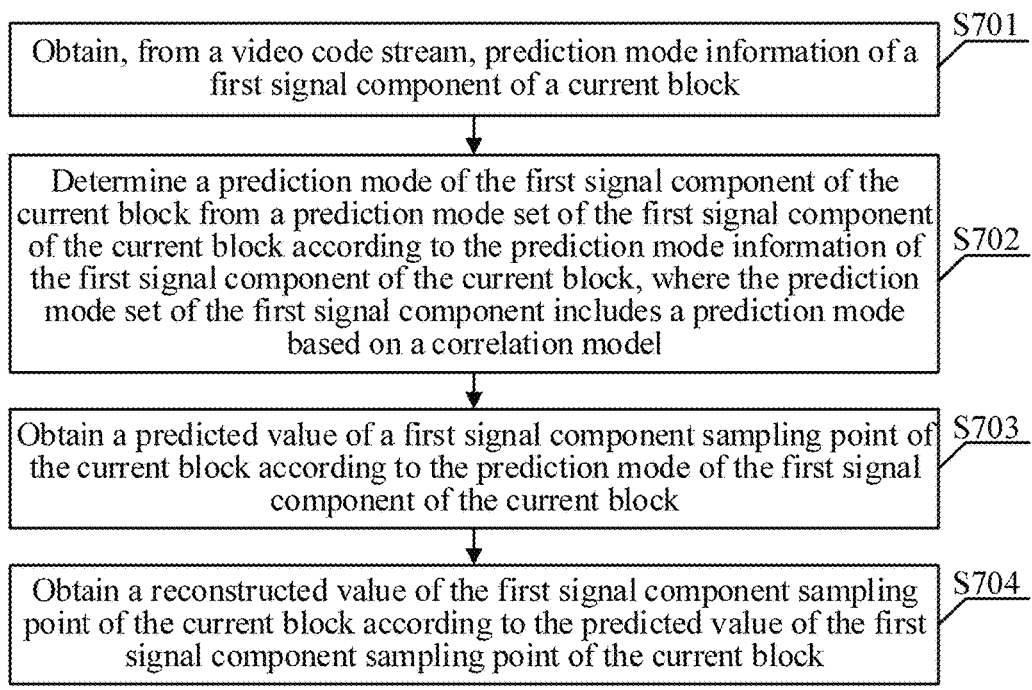
FIG. 7 is a flowchart of an intra-frame decoding method for a signal component sampling point of an image block according to another embodiment of the present disclosure.

The apparatus provided in the embodiment of the present disclosure is configured to implement the method shown in FIG. 7, which is not described herein again.

According to the apparatus provided in the embodiment of the present disclosure, by using a technical means of providing a prediction mode set including an LMA mode and an LML mode for a chrominance component, the accuracy of intra-frame prediction of a current block is improved.

The technology provided in the embodiments of the present disclosure may be applied to the field of digital signal processing and may be implemented using an encoder and a decoder. A video encoder and decoder are widely applied to various communications devices or electronic devices, such as a digital television, a set top box, a media gateway, a mobile phone, a wireless apparatus, a personal digital assistant (PDA), a handheld or portable computer, a global positioning system (GPS) receiver/navigator, a camera, a video player, a video camera, a video tape recorder, a monitoring device, and a video conference and a videophone device. Such a device includes a processor, a memory, and an interface for data transmission. A video codec may be directly implemented by a digital circuit or a chip, such as a digital signal processor (DSP), or may be implemented by software code driving a processor to execute a procedure in the software code.

Persons of ordinary skill in the art may understand that all or a part of the steps of the foregoing method embodiments of the present disclosure may be implemented by a program instructing relevant hardware. The foregoing program may be stored in a computer readable storage medium. When the program is run, the steps of the foregoing method embodiments are performed. The foregoing storage medium includes any medium that is capable of storing program code, such as a read-only memory (ROM), a random-access memory (RAM), a magnetic disk, or an optical disc.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not make the essence of corresponding technical solutions depart from the spirit and scope of the technical solutions in the embodiments of the present disclosure.

What is claimed is:

1. An intra-frame decoding method for a signal component sampling point of an image block, comprising:
   obtaining, from a video code stream, prediction mode information of a first signal component of a current block;
   determining a prediction mode of the first signal component of the current block from a prediction mode set of the first signal component of the current block according to the prediction mode information of the first signal component of the current block, wherein the prediction mode set of the first signal component of the current block comprises at least one of a linear model above (LMA) mode and a linear model left (LML) mode, wherein the LMA mode is a prediction mode for calculating a predicted value of a first component sampling point of the current block based on the reconstructed value of the first adjacent signal component sampling point above the current block, the reconstructed value of the second adjacent signal component sampling point above the current block, and a reconstructed value of a second component sampling point of the current block, and wherein the LML mode is a prediction mode for calculating the predicted value of the first component sampling point of the current block based on the reconstructed value of the first adjacent signal component sampling point on the left side of the current block, the reconstructed value of the second adjacent signal component sampling point on the left side of the current block, and the reconstructed value of the second component sampling point of the current block;
   obtaining a predicted value of a first signal component sampling point of the current block according to the prediction mode of the first signal component of the current block; and
   obtaining a reconstructed value of the first signal component sampling point of the current block according to the predicted value of the first signal component sampling point of the current block.

2. The method according to claim 1, wherein when the prediction mode of the first signal component of the current block that is determined from the prediction mode set of the first signal component of the current block according to the prediction mode information of the first signal component of the current block is the. LMA mode, obtaining the predicted value of the first signal component sampling point of the current block according to the prediction mode of the first signal component of the current block comprises calculating, based on a correlation model, the predicted value of the first signal component sampling point of the current block according to a reconstructed value of a second signal component sampling point of the current block and a parameter of the correlation model, wherein the parameter of the correlation model is obtained through calculation according to a reconstructed value of a first adjacent signal component sampling point above the current block and a reconstructed value of a second adjacent signal component sampling point above the current block.

3. The method according to claim 1, wherein when the prediction mode of the first signal component of the current block that is determined from the prediction mode set of the first signal component of the current block according to the prediction mode information of the first signal component of the current block is the LML mode, obtaining the predicted value of the first signal component sampling point of the current block according to the prediction mode of the first signal component of the current block comprises calculating, based on a correlation model, the predicted value of the first signal component sampling point of the current block according to a reconstructed value of a second signal component sampling point of the current block and a parameter of the correlation model, wherein the parameter of the correlation model is obtained through calculation according to a reconstructed value of a first adjacent signal component sampling point on the left side of the current block and a reconstructed value of a second adjacent signal component sampling point on the left side of the current block.

4. The method according to claim 1, wherein the prediction mode set of the first signal component of the current block comprises a direct mode (DM) mode, a linear method (LM) mode, the LMA mode, the LML mode, a planar mode, a vertical mode, a horizontal mode, and a DC mode.

5. The method according to claim 1, wherein the prediction mode set of the first signal component of the current block comprises a direct mode (DM) mode, a linear method (LM) mode, the LMA mode, and the LML mode.

6. The method according to claim 1, wherein the LM mode is a prediction mode for calculating the predicted value of the first component sampling point of the current block based on the reconstructed values of the first adjacent signal component sampling points above and on the left side of the current block, the reconstructed values of the second adjacent signal component sampling points above and on the left side of the current block, and the reconstructed value of the second component sampling point of the current block.

7. The method according to claim 1, wherein the first signal component is a chrominance component, and wherein a second signal component is a luminance component.

8. An intra-frame decoding method for a signal component sampling point of an image block, comprising:
   obtaining, from a video code stream, prediction mode information of a first signal component of a current block;
   determining a prediction mode of the first signal component of the current block from a prediction mode set of the first signal component of the current block according to the prediction mode information of the first signal component of the current block, wherein the prediction mode set of the first signal component comprises a prediction mode based on a correlation model, and the prediction mode based on the correlation model is determined depending on a prediction mode of a second signal component of the current block;

obtaining a predicted value of a first signal component sampling point of the current block according to the prediction mode of the first signal component of the current block; and obtaining a reconstructed value of the first signal component sampling point of the current block according to the predicted value of the first signal component sampling point of the current block, wherein the prediction mode based on the correlation model is a prediction mode for calculating the predicted value of the first signal component sampling point of the current block using the correlation model according to a reconstructed value of a second signal component sampling point of the current block and a parameter of the correlation model, wherein the prediction mode based on the correlation model is any one of the following prediction modes a linear model above (LMA) mode and a linear model left (LML) mode, wherein the LMA mode is a prediction mode for calculating a predicted value of a first component sampling point of the current block based on the reconstructed value of the first adjacent signal component sampling point above the current block, the reconstructed value of the second adjacent signal component sampling point above the current block, and a reconstructed value of a second component sampling point of the current block, and wherein the LML mode is a prediction mode for calculating the predicted value of the first component sampling point of the current block based on the reconstructed value of the first adjacent signal component sampling point on the left side of the current block, the reconstructed value of the second adjacent signal component sampling point on the left side of the current block, and the reconstructed value of the second component sampling point of the current block.

9. The method according to claim 8, wherein a parameter of the correlation model of the LMA mode is obtained through calculation according to a reconstructed value of a first adjacent signal component sampling point above the current block and a reconstructed value of a second adjacent signal component sampling point above the current block, wherein a parameter of the correlation model of the LML: mode is obtained through calculation according to a reconstructed value of a first adjacent signal component sampling point on the left side of the current block and a reconstructed value of a second adjacent signal component sampling point on the left side of the current block, and wherein a parameter of the correlation model of the LM mode is obtained through calculation according to the reconstructed values of the first adjacent signal component sampling points above and on the left side of the current block and the reconstructed values of the second adjacent signal component sampling points above and on the left side of the current block.

10. The method according to claim 8, wherein when the prediction mode of the first signal component of the current block that is determined from the prediction mode set of the first signal component of the current block according to the prediction mode information of the first signal component of the current block is the LMA mode, obtaining the predicted value of the first signal component sampling point of the current block according to the prediction mode of the first signal component of the current block comprises calculating, based on the correlation model, the predicted value of the first signal component sampling point of the current block according to the reconstructed value of the second signal component sampling point of the current block and the parameter of the correlation model, wherein the parameter of the correlation model is obtained through calculation according to the reconstructed value of the first adjacent signal component sampling point above the current block and the reconstructed value of the second adjacent signal component sampling point above the current block.

11. The method according to claim 8, wherein when the prediction mode of the first signal component of the current block that is determined from the prediction mode set of the first signal component of the current block according to the prediction mode information of the first signal component of the current block is the mode, obtaining the predicted value of the first signal component sampling point of the current block according to the prediction mode of the first signal component of the current block comprises calculating, based on the correlation model, the predicted value of the first signal component sampling point of the current block according to the reconstructed value of the second signal component sampling point of the current block and the parameter of the correlation model, wherein the parameter of the correlation model is obtained through calculation according to the reconstructed value of the first adjacent signal component sampling point on the left side of the current block and the reconstructed value of the second adjacent signal component sampling point on the left side of the current block.

12. The method according to claim 8, wherein the prediction mode set of the first signal component of the current block comprises at least one prediction mode of a direct mode (DM) mode, a planar mode, a vertical mode, a horizontal mode, a direct current (DC) mode, and the prediction mode based on the correlation model.

13. The method according to claim 8, wherein the first signal component is a chrominance component, and wherein the second signal component is a luminance component.

14. A prediction method for a signal component sampling point of an image block, comprising:
calculating, based on a correlation model, a predicted value of a first signal component sampling point of a current block according to a reconstructed value of a second signal component sampling point of the current block and a parameter of the correlation model,
wherein the parameter of the correlation model is obtained through calculation according to a reconstructed value of a first adjacent signal component sampling point in a reference block and a reconstructed value of a second adjacent signal component sampling point in the reference block, and
wherein the reference block comprises one or any combination of the following blocks: an upper left block of the current block, an upper right block of the current block, and right above block of the current block.

15. The method according to claim 14, wherein a first signal component is a chrominance component, and wherein the second signal component is a luminance component.

16. A prediction method for a signal component sampling point of an image block, comprising:

calculating, based on a correlation model, a predicted value of a first signal component sampling point of a current block according to a reconstructed value of a second signal component sampling point of the current block and a parameter of the correlation model, wherein the parameter of the correlation model is obtained through calculation according to a reconstructed value of a first adjacent signal component sampling point in a reference block and a reconstructed value of a second adjacent signal component sampling point in the reference block, and wherein the reference block comprises one or any combination of the following blocks: an upper left block of the current block, a lower left block of the current block, and left block of the current block.

17. The method according to claim 16, wherein a first signal component is a chrominance component, and wherein the second signal component is a luminance component.

* * * * *

UNITED STATES PATENT AND TRADEMARK OFFICE
CERTIFICATE OF CORRECTION

PATENT NO. : 9,900,601 B2
APPLICATION NO. : 15/254669
DATED : February 20, 2018
INVENTOR(S) : Xingyu Zhang et al.

Page 1 of 1

It is certified that error appears in the above-identified patent and that said Letters Patent is hereby corrected as shown below:

Column 24, Line 6, Claim 2 should read:
the current block is the LMA mode, obtaining the predicted Signed and Sealed this
Fourteenth Day of August, 2018

Andrei Iancu
*Director of the United States Patent and Trademark Office*